United States Patent
Velasco

(10) Patent No.: US 9,604,496 B1
(45) Date of Patent: Mar. 28, 2017

(54) TIRE RIM AND ASSOCIATED USE THEREOF

(71) Applicant: Pedro Velasco, Perris, CA (US)

(72) Inventor: Pedro Velasco, Perris, CA (US)

(*) Notice: Subject to any disclaimer, the term of this patent is extended or adjusted under 35 U.S.C. 154(b) by 1012 days.

(21) Appl. No.: 13/651,227

(22) Filed: Oct. 12, 2012

(51) Int. Cl.
*B60B 7/20* (2006.01)

(52) U.S. Cl.
CPC ..................... *B60B 7/20* (2013.01)

(58) Field of Classification Search
CPC .... B60B 7/00; B60B 7/04; B60B 7/06; B60B 7/20
USPC .............. 301/37.25, 37.26, 37.27, 37.41, 58, 301/37.101, 37.102, 108.1, 111.3, 37.108, 301/109
See application file for complete search history.

(56) References Cited

U.S. PATENT DOCUMENTS

| 4,682,820 A * | 7/1987 | Stalter | 301/37.26 |
| 6,926,369 B2 * | 8/2005 | McCaster, III | B60B 7/20 301/37.109 |
| 6,964,454 B1 * | 11/2005 | Miansian | 301/37.25 |
| 7,014,273 B1 * | 3/2006 | Yang | B60B 7/20 301/37.109 |
| 7,100,995 B2 * | 9/2006 | Gilly | 301/37.25 |
| 7,213,888 B2 * | 5/2007 | Simpson | B60B 7/20 301/37.108 |
| 2006/0087171 A1 * | 4/2006 | Riley | 301/37.25 |
| 2006/0208559 A1 * | 9/2006 | Morris | B60B 7/20 301/37.25 |
| 2006/0220440 A1 * | 10/2006 | Treacy | 301/37.25 |
| 2010/0037498 A1 * | 2/2010 | DoVale, Jr. | 40/591 |

* cited by examiner

*Primary Examiner* — S. Joseph Morano
*Assistant Examiner* — Jean Charleston

(57) ABSTRACT

A customizable tire rim includes an outer housing capable of being attached to an existing vehicle wheel, a spinning rim portion in rotational communication with an inner wall of the outer housing, and an interchangeable central hub cap in rotational communication with the spinning rim portion. Advantageously, the interchangeable central hub cap is removably attached to the spinning rim portion in such a manner that the interchangeable central hub cap remains stationary relative to a first rotational movement of the spinning rim portion as well as a second rotational movement of the outer housing.

12 Claims, 5 Drawing Sheets

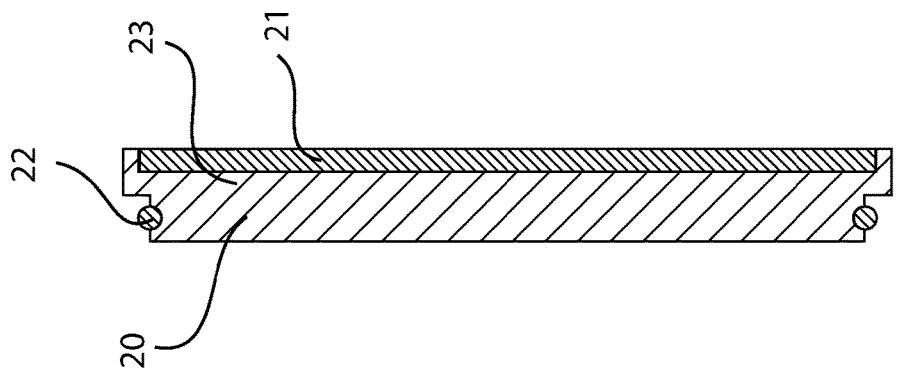
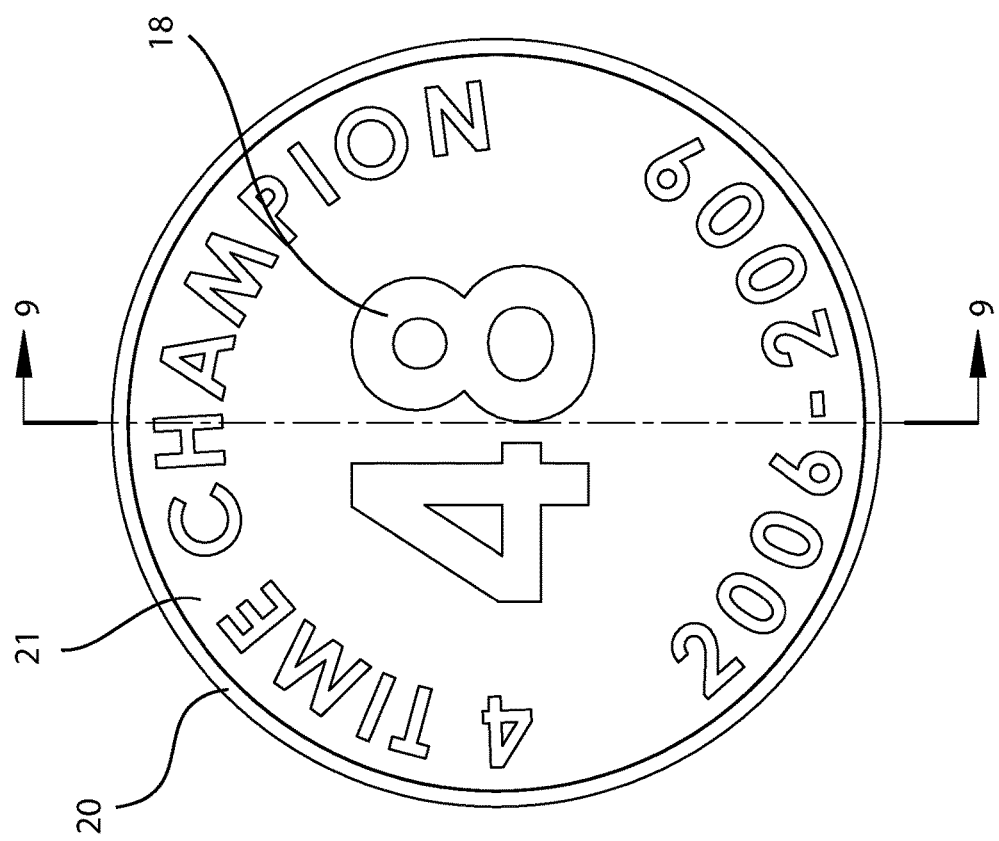

TIRE RIM AND ASSOCIATED USE THEREOF

CROSS REFERENCE TO RELATED APPLICATIONS

This application claims the benefit of U.S. Provisional Application No. 61/546,177 filed Oct. 12, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

Technical Field

This non-limiting exemplary embodiment(s) relates to tire rims and, more particularly, to a tire rim for providing users with an easy and convenient means of turning standard tires into attractive and fancy pieces of art.

Prior Art

Millions of American motorists enjoy the creativity and unique style associated with customizing their automobiles. Personalized license plates, floating neon lights and fancy mud flaps are but a few of the automobile accessories consumers utilize to set their vehicle apart from others on the road. Not surprisingly, accentuating one's vehicle via a customized paint job, monogrammed upholstery, or other personalized elements provides auto enthusiasts an exciting and artistic way in which to express themselves, via their car or truck. An extremely popular way in which people revamp the overall appearance of their cars, trucks, and vans, is by installing a new set of tires. Produced in a variety of styles, such as mag wheels, low profile, whitewashed and modular, a new set of tires can vastly improve the appearance of any auto.

Although most car enthusiasts would agree that the "right" tires are a crucial element to the overall design of their automobile, it is common knowledge that a set of high-polished rims can add the perfect finishing touch. Like tires, rims are manufactured in a wide variety of materials and designs. Shiny chrome, gold plated, or polished aluminum; rims are an attractive accessory that most automobile aficionados recognize as an important design component. One of the most popular designs of rims available today is "spinners." Featuring a series of radiating spokes which rotate about the rim's central axis, spinners provide auto enthusiast a highly sought after and extravagant means of setting one's vehicle apart from others on the road.

While rims are produced in a myriad of designs to appeal to a broad range of consumers, manufacturers such as Prime, Eagle Alloys, Primax, Konig and ADR are continually developing new, exciting designs to entice customers and satisfy the many needs of car enthusiasts.

Accordingly, a need remains for an apparatus in order to overcome the above-noted shortcomings. The present invention satisfies such a need by providing a tire rim that is convenient and easy to use, lightweight yet durable in design, versatile in its applications, and designed for turning standard tires into attractive and fancy pieces of art.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a customizable tire rim for displaying a personalized logo. These and other objects, features, and advantages of the non-limiting exemplary embodiment(s) are provided by a customizable tire rim including an outer housing capable of being attached to an existing vehicle wheel, a spinning rim portion in rotational communication with an inner wall of the outer housing, and an interchangeable central hub cap in rotational communication with the spinning rim portion. Advantageously, the interchangeable central hub cap is removably attached to the spinning rim portion in such a manner that the interchangeable central hub cap remains stationary relative to a first rotational movement of the spinning rim portion as well as a second rotational movement of the outer housing.

In a non-limiting exemplary embodiment, the first rotational movement of the spinning rim portion operates independently of the stationary interchangeable central hub cap as well as the second rotational movement of the outer housing.

In a non-limiting exemplary embodiment, the spinning rim portion includes a central hub and a plurality of spokes statically attached thereto. Notably, the interchangeable central hub cap is rotatably engaged with the central hub in such a manner that the interchangeable central hub cap remains stationary relative to a synchronous rotational movement of the central hub and the spokes.

In a non-limiting exemplary embodiment, the interchangeable central hub cap is provided with surface indicia displaying a logo.

In a non-limiting exemplary embodiment, the logo on the interchangeable central hub cap remains stationary and upright relative to the synchronous rotational movement of the central hub and the spokes.

In a non-limiting exemplary embodiment, the interchangeable central hub cap includes a central collar rotatably disposed within the central hub in such a manner that the central collar remains stationary relative to the synchronous rotational movement of the central hub and the spokes. A center mount is removably coupled to an outer face of the central collar wherein the center mount has an outer wall provided with a counter sunk receiving surface stepped inwardly therefrom. A plate is interfitted directly within the counter sunk receiving surface of the center mount and a fastener is intercalated between the central collar and the center mount. In this manner, the plate has a center of mass coaxially aligned with a center of mass of the center mount.

In a non-limiting exemplary embodiment, the interchangeable central hub cap further includes a plurality of anchors statically connected to an inner face of the central collar and rotatably connected to the central hub. Notably, the central collar, the center mount, the plate and the anchors remain stationary relative to the synchronous rotational movement of the central hub and the spokes.

In a non-limiting exemplary embodiment, the outer housing, the spinning rim portion, the central hub, the central collar, the center mount, and the plate are coaxially aligned at a center of the tire rim.

The disclosure further includes a method of utilizing a customizable tire rim for displaying a personalized logo. Such a method includes the steps of: providing an outer housing capable of being attached to an existing vehicle wheel; providing and rotationally communicating a spinning rim portion with an inner wall of the outer housing; providing and rotationally communicating an interchangeable central hub cap with the spinning rim portion; and removably attaching the interchangeable central hub cap to the spinning rim portion such that the interchangeable central hub cap remains stationary relative to a first rotational movement of the spinning rim portion as well as a second rotational movement of the outer housing.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 8 is a front elevational view of the plate attached to the center mount; and FIG. 9 is a cross-sectional view taken along line 9-9 in FIG. 8 showing the structural interrelationship between the center mount, O-ring and plate.

Figure 2:
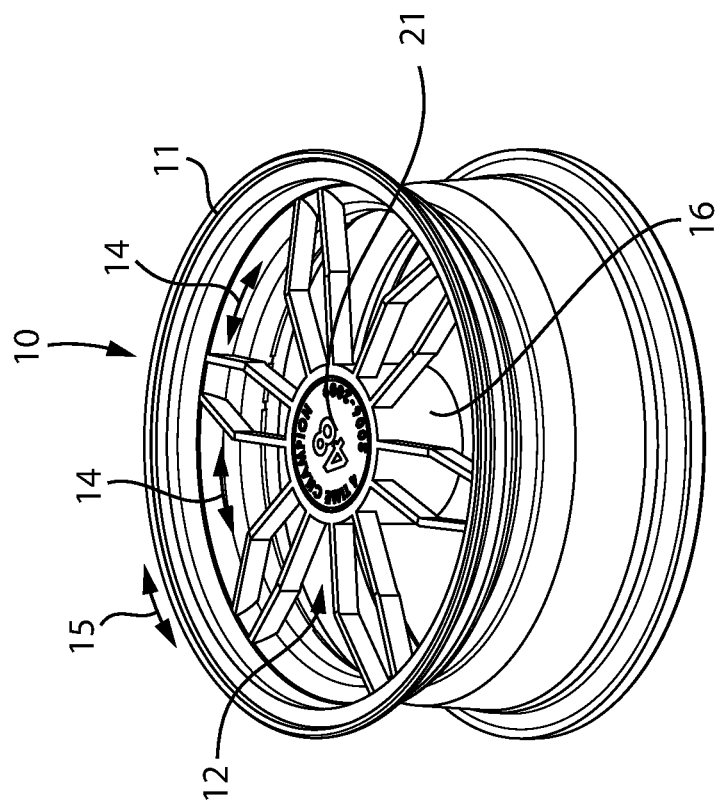
FIGS. 1 and 2 are perspective views showing a tire rim having an outer housing, a spinning rim portion and an interchangeable central hub cap that remains stationary relative to a first rotational movement of the spinning rim portion and a second rotational movement of the outer housing, in accordance with the non-limiting exemplary embodiment(s)

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 1:
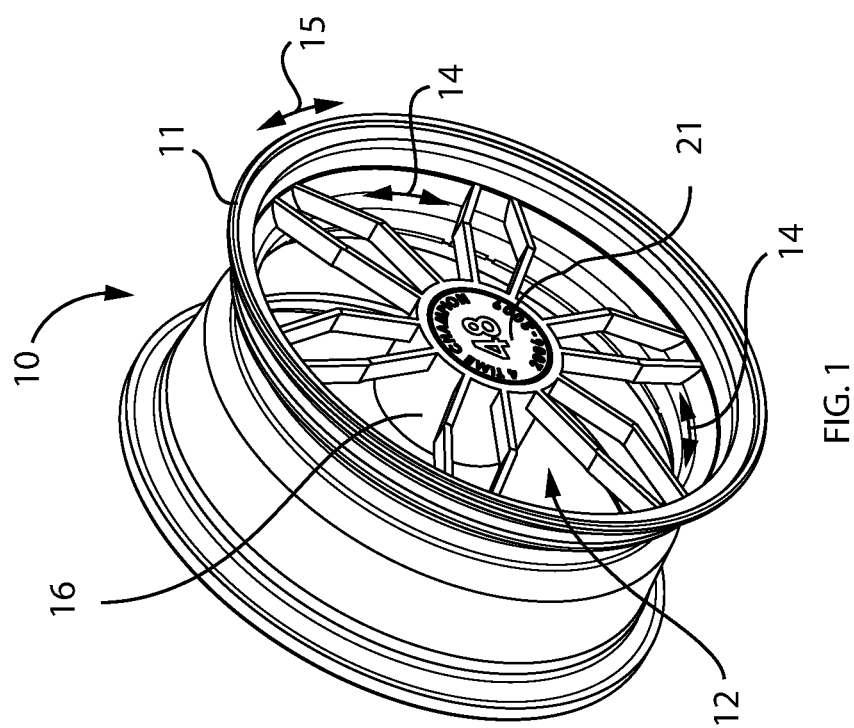
Figure 3:
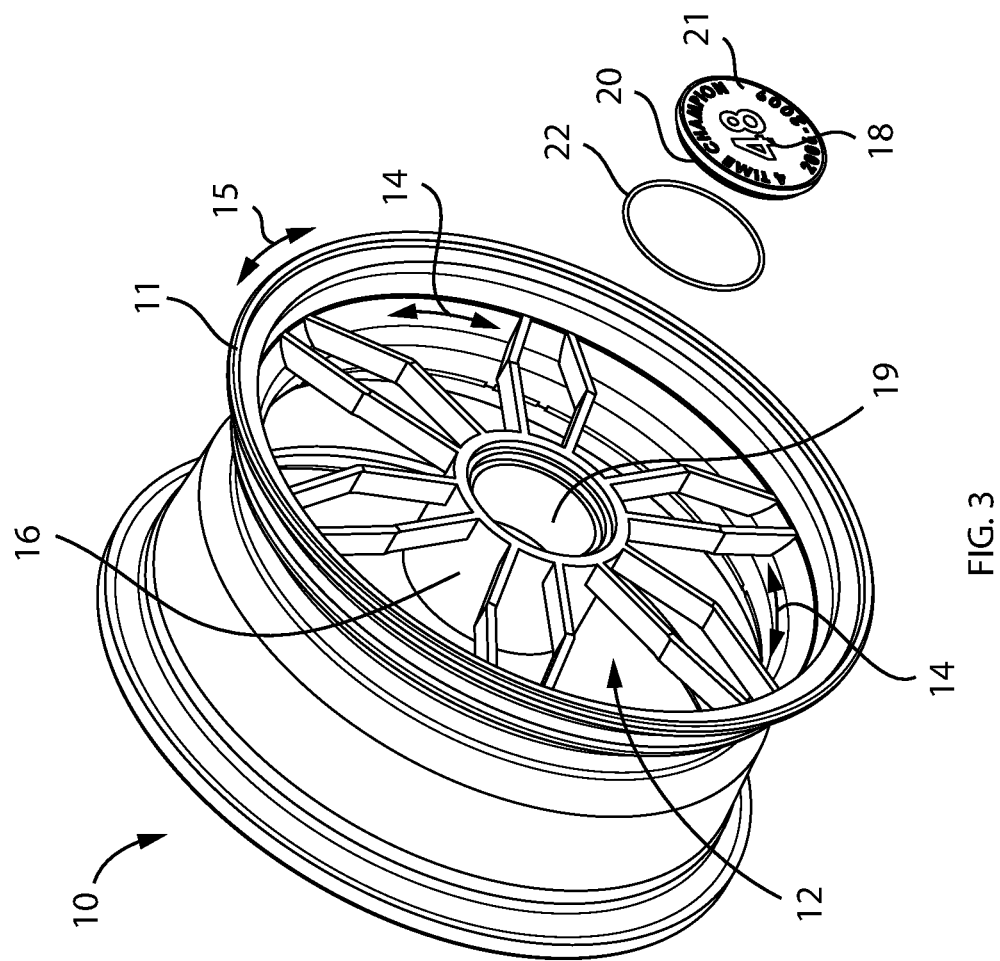
FIG. 3 is an exploded view showing the interchangeable central hub cap and fastener (O-ring) separated from the central collar.
Figure 5:
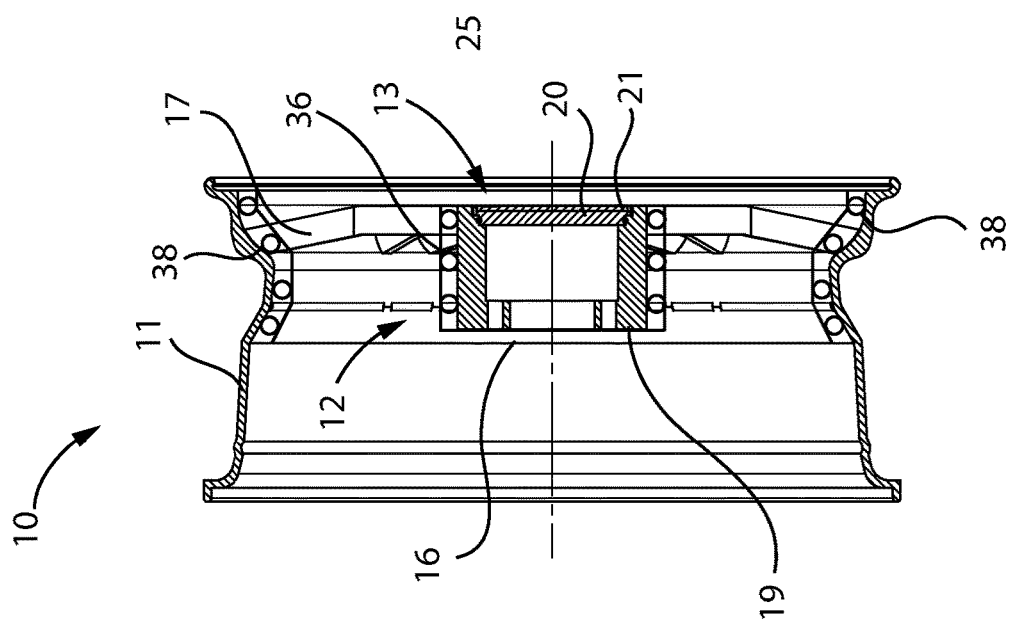
FIG. 5 is a cross-sectional view taken along line 5-5 in FIG. 4 showing the structural interrelationship between the outer housing, spinning rim portion and interchangeable central hub when the center mount, O-ring and plate are connected to the central collar.
Figure 4:
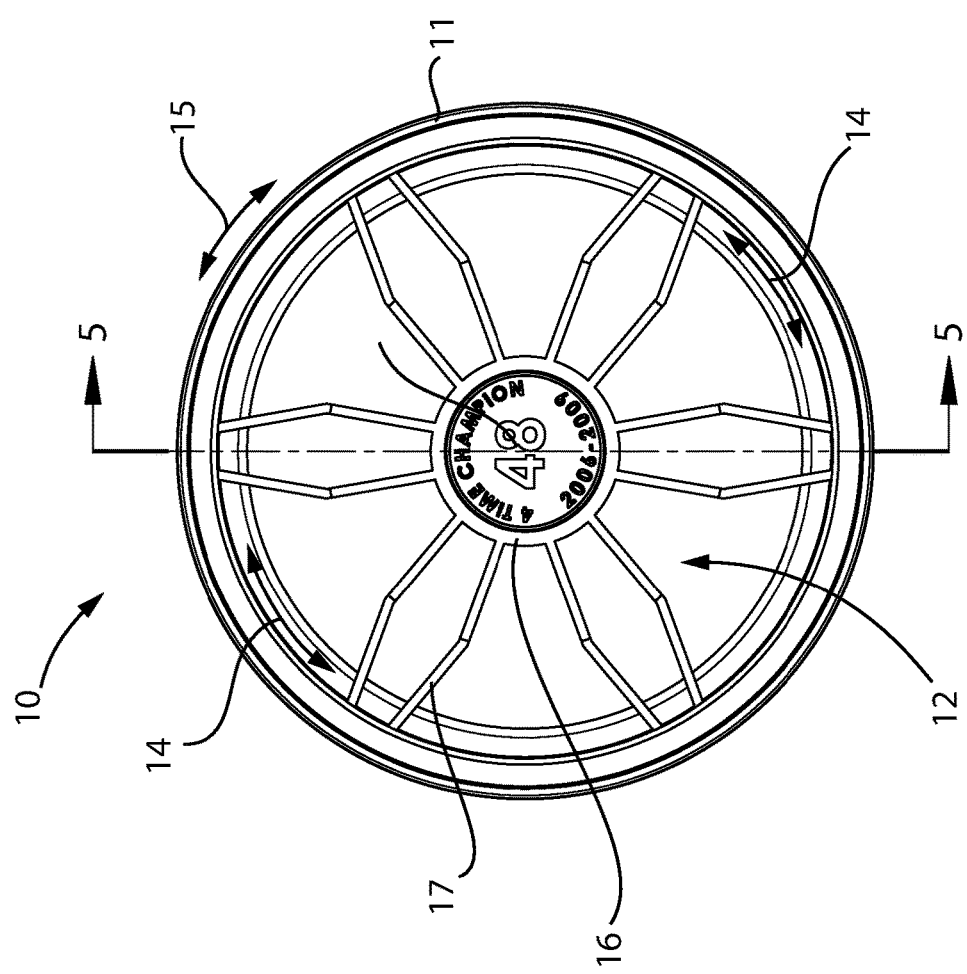
FIG. 4 is a front elevational view showing the stationary interchangeable central hub cap relative to the first rotation movement of the outer housing and the second rotational movement of the spinning rim portion.
Figure 7:
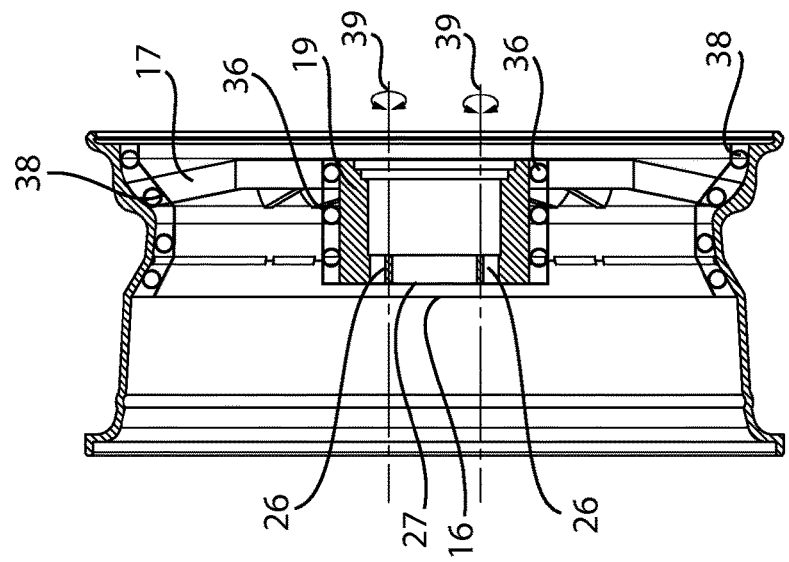
FIG. 7 is a cross-sectional view taken along line 7-7 in FIG. 6 showing the structural interrelationship between the outer housing, spinning rim portion and interchangeable central hub when the center mount, O-ring and plate are removed from the central collar.
Figure 6:
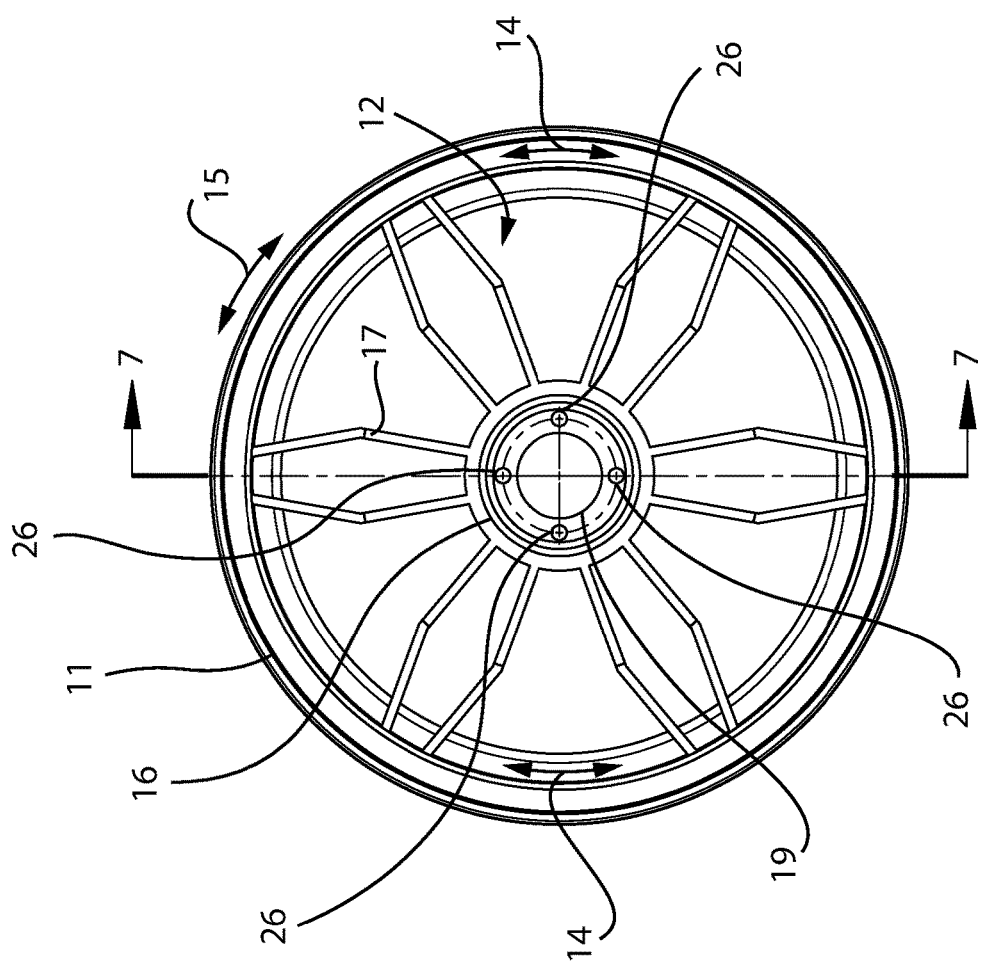
FIG. 6 is a front elevational view showing the center mount, O-ring and plate removed from the central collar.

The non-limiting exemplary embodiment(s) is/are referred to generally in FIGS. 1-9 and is/are intended to provide a customizable tire rim having a stationary personalized central hub cap that is interchangeably attached to a spinning rim portion of the tire rim. It should be understood that such non-limiting exemplary embodiment(s) may be used to customize many different types of tire rims, and should not be limited to any particular type of tire rim.

Referring to the FIGS. 1-9 in general, a customizable tire rim 10 includes an outer housing 11 capable of being attached to an existing vehicle wheel, a spinning rim portion 12 in rotational communication with an inner wall of the outer housing 11 (such rotational communication may be achieved by bearings 39 or other conventional elements well-known in the industry), and an interchangeable central hub cap 13 in rotational communication with the spinning rim portion 12. Advantageously, the interchangeable central hub cap 13 is removably attached to the spinning rim portion 12 in such a manner that the interchangeable central hub cap 13 remains stationary relative to a first rotational movement 14 of the spinning rim portion 12 as well as a second rotational movement 15 of the outer housing 11.

In a non-limiting exemplary embodiment, the first rotational movement 14 of the spinning rim portion 12 operates independently of the stationary interchangeable central hub cap 13 as well as the second rotational movement 15 of the outer housing 11.

In a non-limiting exemplary embodiment, the spinning rim portion 12 includes a central hub 16 and a plurality of spokes 17 statically attached thereto. Notably, the interchangeable central hub cap 13 is rotatably engaged with the central hub 16 in such a manner that the interchangeable central hub cap 13 remains stationary relative to a synchronous rotational movement (along first rotational movement 14) of the central hub 16 and the spokes 17.

In a non-limiting exemplary embodiment, the interchangeable central hub cap 13 is provided with surface indicia displaying a logo 18.

In a non-limiting exemplary embodiment, the logo 18 on the interchangeable central hub cap 13 remains stationary and upright relative to the synchronous rotational movement (along first rotational movement 14) of the central hub 16 and the spokes 17.

In a non-limiting exemplary embodiment, the interchangeable central hub cap 13 includes a central collar 19 rotatably disposed within the central hub 16 in such a manner that the central collar 19 remains stationary relative to the synchronous rotational movement (along first rotational movement 14) of the central hub 16 and the spokes 17. A center mount 20 is removably coupled to an outer face of the central collar 19 wherein the center mount 20 has an outer wall provided with a counter sunk receiving surface 23 stepped inwardly therefrom. A plate 21 is interfitted directly within the counter sunk receiving surface 23 of the center mount 20 and a fastener 22 is intercalated between the central collar 19 and the center mount 20. In this manner, the plate 21 has a center of mass coaxially 25 aligned with a center of mass of the center mount 20.

In a non-limiting exemplary embodiment, the interchangeable central hub cap 13 further includes a plurality of anchors 26 statically connected to an inner face of the central collar 19 and rotatably connected to the central hub 16. Notably, the central collar 19, the center mount 20, the plate 21 and the anchors 26 remain stationary relative to the synchronous rotational movement (along first rotational movement 14) of the central hub 16 and the spokes 17. As an example, bearings 36 (or other suitable elements well known in the art) may be intercalated between the outer perimeter of central collar 19 and inner perimeter of central hub 16 such that central hub 16 rotates independently of central collar 19. One skilled in the art understands there are various ways to maintain central collar 19 independently mated to central hub 16, without departing from the true scope and spirit of the disclosure. A similar configuration may be arranged with bearings 38 intercalated between the outer perimeter of spinning rim portion 12 and inner perimeter of outer housing 11.

In a non-limiting exemplary embodiment, the outer housing 11, the spinning rim portion 12, the central hub 16, the central collar 19, the center mount 20, and the plate 21 are coaxially 25 aligned at a center of the tire rim 10. For example, anchors 26 may have a threaded portion that is mated with the central collar 19 and a non-threaded portion that is rotatably coupled to central hub 16 such that central hub 16 is permitted to rotate about anchors 26 (via axes 39) while the central collar 19 remains statically engaged with anchors 26.

The disclosure further includes a method of utilizing a customizable tire rim 10 for displaying a personalized logo 18. Such a method includes the steps of: providing an outer housing 11 capable of being attached to an existing vehicle wheel; providing and rotationally communicating a spinning rim portion 12 with an inner wall of the outer housing 11; providing and rotationally communicating an interchangeable central hub cap 13 with the spinning rim portion 12; and removably attaching the interchangeable central hub cap 13 to the spinning rim portion 12 such that the interchangeable central hub cap 13 remains stationary relative to a first rotational movement 14 of the spinning rim portion 12 as well as a second rotational movement 15 of the outer housing 11.

In a non-limiting exemplary embodiment, the tire rim 10 (apparatus) preferably includes a set of specially designed spinning rim portion 12 with interchangeable central hub cap 13 designed to remain stationary and upright during rotational movement of the outer housing 11 and spinning rim portion 12. Developed with the sports fan in mind, interchangeable central hub cap 13 is adorned with the logo 18 of a professional or college team or other desired entity, thus appealing to both auto lovers and sports enthusiasts alike. Manufactured primarily of highly polished chrome or plated metal material, each tire rim 10 may be produced in a range of sizes to accommodate the various make and model vehicles and tires on the road.

Radiating from the center of each tire rim 10 may be a series of wire spokes 17 or flat blades, at which the central hub 16 is mounted. This central hub 16 is rotatably coupled to an interchangeable central hub cap 13 measuring approximately 5" in diameter with the underside of the center mount 20 boasting a threaded O-ring 22 measuring approximately 4¼" in diameter and ½" in depth. Measuring ¼" in width, such a threaded fastener 22 may work in conjunction with a central collar 19 and center mount 20 recessed ¾". In this way, the interchangeable central hub cap 13 may be easily removed and replaced, by unscrewing it from the central collar 12, thus enabling the user to modify their tire rim 10 design from one season to the next in order to celebrate different sporting teams. As mentioned, plate 21 is configured so that it remains in the stationary upright position, with the radiating spokes 17 or blades of the spinning rim portion 12 designed to rotate about the center mount 20 and plate 21 in rotational direction.

In a non-limiting exemplary embodiment, carefully etched into plate 21 surface may be the logo 18, surface indicia or insignia of a professional or amateur sports team. Such a logo 18 may be enameled on the surface of plate 21 in bold team colors, thus creating a striking contrast to the polished chrome. The tire rim 10 may feature the logos 18 of all professional teams from all sporting genres, such as football, basketball, baseball and hockey, as well as the logos 18 of university teams or amateur clubs. For instance, the tire rim 10 may be adorned with the logo 18 of the baseball teams, hockey teams, or football teams, to name a few options. Other information may also be included which celebrates a specific player or championship season.

In a non-limiting exemplary embodiment, a ⅜" lip may run the perimeter of the top of the central hub 16, with the actual spokes 17 or blades of tire rim 10 fanning outwards therefrom. Although the length of the spokes 17 or blades which radiate about the central hub 16 may vary in accordance to the actual size of the tire, exemplary spokes 17 may measure 6⁷⁄₁₆" in length and approximately ¼" in diameter. Each spoke may be spaced 1½" apart and configured in paired sets, with each spoke slightly angled outwards and up toward the central hub 16 and back inwards and down at the point of the wheel.

In a non-limiting exemplary embodiment, a kit may include a set of four tire rims 10 with interchangeable center hub caps 13 (i.e., center mount 20, plate 21), respectively.

There are many benefits and advantages associated with the tire rim 10. As an example, the tire rim 10 may provide automobile enthusiasts with a striking and attractive means of improving the appearance of their car. Dazzling spinning rims boasting interchangeable central hub caps 13 that remain upright and stationary as the spokes 17 or blades rapidly rotate, the tire rim 10 provides the car lover a unique means in which to transform the look of their ride. Advantageously, because the interchangeable central hub cap 13 remains upright as the spinning rim portion 12, the logo 18 displayed on the interchangeable central hub cap 13 is carefully displayed at all times, providing a prominent and clearly visible means of celebrating a favorite team, even while traveling down the highway at high speeds. Because of this, the tire rim 10 offers the sport enthusiast an easy means of turning an ordinary set of tire rims 10 into unique and celebratory showpieces.

Boldly displaying the logo 18 of any professional or collegiate team, the tire rim 10 offers consumers a unique means of showing fan appreciation or pride in one's alma mater. Offering a classy and unique way in which to offer a "shout-out" to a beloved sports team, the tire rim 10 proves a striking conversation piece at any tailgating party or simply when parking one's vehicle at work or school. Motorists and sports fans should especially appreciate that the tire rim 10 may be easily updated to accommodate changing sports seasons, enabling them to showcase a love of baseball, football and basketball at the same time these games are held. Auto lovers who collect vintage classics or who enjoy restoring newer cars may also appreciate these striking rim designs.

Offering a simple means of turning one's automobile into a customized show piece, the tire rim 10 provides a practical way in which to set one's auto apart from others on the road. Simply stated, the tire rim 10 provides the car lover a creative means of customizing their automobile to express their very own tastes and to suit their individual personality.

In a non-limiting exemplary embodiment, the tire rim 10 would be simple and straightforward to use. First, the user may choose a plate 21 bearing a logo 18 according to his or her favorite athletic team. By way of example, a diehard hockey fan may purchase rims emblazoned with their team's logo, while a football enthusiast might choose rims adorned with the logo of college, professional or any other favorite team. The user may then have the tire rim 10 professionally installed on their vehicle by a mechanic or service technician, or in the case of the skilled auto lover, they may simply install tire rim 10 themself. As sports seasons change, the user might change interchangeable central hub cap 13 (i.e., center mount 20 and plate 21) accordingly. For instance, at the end of baseball season, the user may remove the plate 21 boasting the logo 18, replacing it with another plate 21 celebrating another team. In this manner, the user may celebrate their favorite team during that team's sports season, while also remaining on the cutting edge with their stylish tire rim 10 design.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A customizable tire rim for displaying a personalized logo, said customizable tire rim comprising:
   an outer housing;
   a spinning rim portion in rotational communication with said outer housing; and
   an interchangeable central hub cap in rotational communication with said spinning rim portion;
   wherein said interchangeable central hub cap is removably attached to said spinning rim portion in such a manner that said interchangeable central hub cap remains stationary relative to a first rotational movement of said spinning rim portion as well as a second rotational movement of said outer housing;

wherein said first rotational movement of said spinning rim portion operates independently of said stationary interchangeable central hub cap as well as said second rotational movement of said outer housing;

wherein said spinning rim portion comprises: a central hub and a plurality of spokes statically attached thereto;

wherein said interchangeable central hub cap is rotatably engaged with said central hub in such a manner that said interchangeable central hub cap remains stationary relative to a synchronous rotational movement of said central hub and said spokes;

wherein said interchangeable central hub cap comprises
a central collar rotatably disposed within said central hub in such a manner that said central collar remains stationary relative to said synchronous rotational movement of said central hub and said spokes,
a center mount removably coupled to an outer face of said central collar, said center mount having an outer wall provided with a counter sunk receiving surface stepped inwardly therefrom,
a plate interfitted directly within said counter sunk receiving surface of said center mount, and
a fastener intercalated between said central collar and said center mount;
wherein said plate has a center of mass coaxially aligned with a center of mass of said center mount.

2. The customizable tire rim of claim 1, wherein said interchangeable central hub cap is provided with surface indicia displaying a logo.

3. The customizable tire rim of claim 2, said logo on said interchangeable central hub cap remains stationary and upright relative to said synchronous rotational movement of said central hub and said spokes.

4. The customizable tire rim of claim 1, wherein said interchangeable central hub cap further comprises: a plurality of anchors statically connected to an inner face of said central collar and rotatably connected to said central hub;
wherein said central collar, said center mount, said plate and said anchors remain stationary relative to said synchronous rotational movement of said central hub and said spokes.

5. The customizable tire rim of claim 1, wherein said outer housing, said spinning rim portion, said central hub, said central collar, said center mount, and said plate are coaxially aligned at a center of said tire rim.

6. A customizable tire rim for displaying a personalized logo, said customizable tire rim comprising:
an outer housing capable of being attached to an existing vehicle wheel;
a spinning rim portion in rotational communication with an inner wall of said outer housing; and
an interchangeable central hub cap in rotational communication with said spinning rim portion;
wherein said interchangeable central hub cap is removably attached to said spinning rim portion in such a manner that said interchangeable central hub cap remains stationary relative to a first rotational movement of said spinning rim portion as well as a second rotational movement of said outer housing;
wherein said spinning rim portion comprises: a central hub and a plurality of spokes statically attached thereto;
wherein said interchangeable central hub cap is rotatably engaged with said central hub in such a manner that said interchangeable central hub cap remains stationary relative to a synchronous rotational movement of said central hub and said spokes;

wherein said interchangeable central hub cap comprises an inner perimeter,
a central collar rotatably disposed within said central hub in such a manner that said central collar remains stationary relative to said synchronous rotational movement of said central hub and said spokes, said central collar having an outer perimeter;
a plurality of first bearings intercalated between said outer perimeter of said central collar and said inner perimeter of said central hub;
a center mount removably coupled to an outer face of said central collar, said center mount having an outer wall provided with a counter sunk receiving surface stepped inwardly therefrom,
a plate interfitted directly within said counter sunk receiving surface of said center mount, and
a fastener intercalated between said central collar and said center mount;
wherein said plate has a center of mass coaxially aligned with a center of mass of said center mount;
said spinning rim portion having an outer perimeter;
said outer housing having an inner perimeter;
a plurality of second bearings intercalated between said outer perimeter of said spinning rim portion and said inner perimeter of said outer housing.

7. The customizable tire rim of claim 6, wherein said first rotational movement of said spinning rim portion operates independently of said stationary interchangeable central hub cap as well as said second rotational movement of said outer housing.

8. The customizable tire rim of claim 6, wherein said interchangeable central hub cap is provided with surface indicia displaying a logo.

9. The customizable tire rim of claim 8, said logo on said interchangeable central hub cap remains stationary and upright relative to said synchronous rotational movement of said central hub and said spokes.

10. The customizable tire rim of claim 6, wherein said interchangeable central hub cap further comprises: a plurality of anchors statically connected to an inner face of said central collar and rotatably connected to said central hub;
wherein said central collar, said center mount, said plate and said anchors remain stationary relative to said synchronous rotational movement of said central hub and said spokes.

11. The customizable tire rim of claim 6, wherein said outer housing, said spinning rim portion, said central hub, said central collar, said center mount, and said plate are coaxially aligned at a center of said tire rim.

12. A method of utilizing a customizable tire rim for displaying a personalized logo, said comprising the steps of:
providing an outer housing capable of being attached to an existing vehicle wheel;
providing and rotationally communicating a spinning rim portion with an inner wall of said outer housing;
providing and rotationally communicating an interchangeable central hub cap with said spinning rim portion; and
removably attaching said interchangeable central hub cap to said spinning rim portion such that said interchangeable central hub cap remains stationary relative to a first rotational movement of said spinning rim portion as well as a second rotational movement of said outer housing;
wherein said spinning rim portion comprises: a central hub and a plurality of spokes statically attached thereto;
wherein said interchangeable central hub cap is rotatably engaged with said central hub in such a manner that said interchangeable central hub cap remains stationary relative to a synchronous rotational movement of said central hub and said spokes;

wherein said interchangeable central hub cap comprises an inner perimeter, a central collar rotatably disposed within said central hub in such a manner that said central collar remains stationary relative to said synchronous rotational movement of said central hub and said spokes, said central collar having an outer perimeter;

a plurality of first bearings intercalated between said outer perimeter of said central collar and said inner perimeter of said central hub;

a center mount removably coupled to an outer face of said central collar, said center mount having an outer wall provided with a counter sunk receiving surface stepped inwardly therefrom, a plate interfitted directly within said counter sunk receiving surface of said center mount, and a fastener intercalated between said central collar and said center mount;

wherein said plate has a center of mass coaxially aligned with a center of mass of said center mount;

said spinning rim portion having an outer perimeter;

said outer housing having an inner perimeter;

a plurality of second bearings intercalated between said outer perimeter of said spinning rim portion and said inner perimeter of said outer housing.

* * * * *